(12) United States Patent
Loeffler-Lenz

(10) Patent No.: US 7,300,610 B2
(45) Date of Patent: Nov. 27, 2007

(54) METHOD FOR FORMING CAVITIES OF COMPLEX CONFIGURATION WITHIN CONCRETE

(76) Inventor: Federico Loeffler-Lenz, 417 W. River Rd., Palatka, FL (US) 32177

( * ) Notice: Subject to any disclaimer, the term of this patent is extended or adjusted under 35 U.S.C. 154(b) by 420 days.

(21) Appl. No.: 10/723,080

(22) Filed: Nov. 26, 2003

(65) Prior Publication Data

US 2005/0110179 A1   May 26, 2005

(51) Int. Cl.
  *B28B 1/32* (2006.01)
  *B28B 1/29* (2006.01)
  *B28B 7/32* (2006.01)
  *E04B 1/16* (2006.01)

(52) U.S. Cl. .................. 264/33; 264/333; 106/38.3; 249/165

(58) Field of Classification Search ................ 264/33, 264/333; 106/38.3; 249/165
See application file for complete search history.

(56) References Cited

U.S. PATENT DOCUMENTS

| | | | |
|---|---|---|---|
| 992,782 A | 5/1911 | Lambie | |
| 1,552,064 A * | 9/1925 | Lake | ............................ 264/86 |
| 3,682,434 A | 8/1972 | Boenig | |
| 3,729,165 A | 4/1973 | Trimble | |
| 4,728,073 A | 3/1988 | Smith | |
| 4,997,602 A | 3/1991 | Trimble | |
| 5,032,197 A | 7/1991 | Trimble | |
| 5,108,671 A | 4/1992 | Chapdelaine | |
| 5,464,886 A * | 11/1995 | Tran et al. | ................... 523/428 |

* cited by examiner

*Primary Examiner*—Christina Johnson
*Assistant Examiner*—Patrick Butler
(74) *Attorney, Agent, or Firm*—Thomas C. Saitta

(57) ABSTRACT

A form for creating cavities within large concrete structures, wherein the formed is created by interconnecting a plurality of section members, the section members having flexible mold skeleton members retaining polymer-aggregate panel members, and wherein the form may be internally pressurized to increase its rigidity and weight-bearing capability. The mold skeleton members have annular and longitudinal flanges that are used as planing guides to form the external surface of the polymer-aggregate panel members. Preferably, spacer members are inserted between the annular and longitudinal flanges and the spacer members are used as planing guides. The adjacent section members are mechanically joined to each other, such that the form may be disassembled and re-used.

14 Claims, 4 Drawing Sheets

METHOD FOR FORMING CAVITIES OF COMPLEX CONFIGURATION WITHIN CONCRETE

BACKGROUND OF THE INVENTION

This invention relates generally to the field of concrete construction and more particularly to the field of concrete formwork systems and methods utilized to create internal cavities within monolithic concrete structures. More particularly, the invention relates to such systems and methods wherein modular or sectional formwork is used. Even more particularly, the invention relates to such systems and methods wherein the internal cavities are bores, tubes or tunnels of complex configuration having smooth, curved surfaces, such as the spiral cases or draft tubes found in hydro-electric power plants.

It is often necessary to produce internal cavities, such as chambers, bores, tubes, tunnels, passages or the like, within large monolithic concrete structures. In many instances, this is accomplished by constructing a form, the outer surface of which conforms to the desired interior surface of the cavity. Wet concrete is poured around the form, allowed to cure, and the form is removed to expose the cavity. A common method is to construct the form out of wooden components. This method is labor intensive and works best only with relatively simple cavity shapes having planar surfaces or segments of surfaces. Production of a form having complex, curved surfaces, such as a tube or a bore, is difficult and time-consuming, especially where accuracy and surface precision is essential in the finished structure. Dismantling the wooden form is also a difficult and time-consuming task.

Because of the drawbacks inherent in wooden forms, it is also known to create sectional or modular forms out of metal segments. The metal segments are sturdier and can be re-used to form multiple cavities, but must be constructed of relatively small dimension due to the increased weight. Examples of segmented metal forms for the formation of cavities within concrete structures can be seen in U.S. Pat. No. 992,782 to Lambie, U.S. Pat. No. 3,729,165 to Trimble, U.S. Pat. No. 4,997,602 to Trimble, and U.S. Pat. No. 5,032,197 to Trimble, which all disclose metal forms for creating manholes. The use of such methodologies, however, typically produces bore or tubular surfaces with stepped or angled annular junctions joining short sections or segments that are planar in one or both directions. In many situations where optimization and control of aerodynamic or hydrodynamic flow is required, cavities produced by this method are less efficient due to the flow interruptions caused by the junctions.

It is also known to utilize sectional or segmented forms composed of plastic, fiberglass or similar material. Examples are shown in U.S. Pat. No. 3,682,434 to Boenig, which shows external forms joined to receive wet concrete in the interior of the form, and U.S. Pat. No. 4,728,073 to Smith, which shows the use of flexible panels to create reservoir walls. Use of plastic forms is limited due to the lightweight and flexible nature of the material, and bracing or other types of supporting frameworks are necessary for any applications of large dimension. The known systems and methods utilizing plastic forms are not suitable for large concrete structures due to the massive weight of the concrete that must be supported by the forms during the curing process. For example, a spiral case bore for delivering water into a turbine within a hydroelectric power plant may have poured concrete walls four meters or more in thickness surrounding a bore having a diameter of eighteen feet or more.

An alternative sectional system and method wherein metal forms are utilized to define the internal cavity within a large monolithic concrete structure, and in particular as used for creating a large draft tube that receives water from the turbine in a hydroelectric power plant, is disclosed in U.S. Pat. No. 5,108,671 to Chapdelaine. In this system, the sectional forms are composed of pre-formed concrete panels embedded within peripheral metal frames. The metal frames of adjacent panels are joined together by mechanical fasteners. While this produces panels that are very rigid and durable, the material composition insures that they are extremely heavy. Thus, assembly and disassembly of the forms is difficult and the maximum overall dimensions of each panel are severely limited, increasing the number of joints required to construct a form.

It is an object of this invention to provide a system and a method of creating a cavity within a large monolithic concrete structure, in particular wherein the cavity is a tube, duct or bore of curvilinear or irregular shape, such as found in the spiral cases or draft tubes of hydro-power plants, in wind tunnels, in sewage systems, etc. It is an object to provide such a system and method of increased efficiency, where the bore has no undesirable corners or edges and can be formed in an infinite number of shapes, dimensions and transitions. It is a further object to provide such a system and method wherein the cavity is created by assembling, either prefabricated or on-site, sectional elements that can be disassembled, removed and re-used to create additional cavities of identical structure. It is a further object to provide such a system and method such that problems inherent in the previously known systems and methods are obviated. It is a further object to provide such a system and method wherein the cavity is precisely defined, the smoothness of the cavity surface is optimized for hydrodynamic or aerodynamic characteristics, the form is sectional or modular in nature, and the assembly and disassembly of the form is readily accomplished in a time efficient manner. It is a further object to provide such a system and method wherein the sections or panels comprising the form are relatively lightweight and somewhat flexible, each section comprising a relatively low density, lightweight, low compressive strength, slightly flexible, polymer-aggregate concrete member disposed within a flexible, flanged skeleton mold member. These and other objects not expressly set forth above will be made apparent by the disclosure to follow.

SUMMARY OF THE INVENTION

The invention is a system or apparatus and a method for creating cavities of complex configuration within large monolithic concrete structures or blocks, typically bore-like or tubular with curvilinear walls of varying dimensions and lacking internal corners or edges. In particular, the system and method are appropriate for the formation of spiral cases and draft tubes in hydroelectric power plants, wind tunnels, sewage conduits, or similar objects. The system comprises an internal form or plug defined by temporarily joined section members, wherein the outer surface of the form is configured to precisely define the interior surface of cavity. Each section member of the form comprises a skeleton mold member and a polymer-aggregate concrete panel member. The skeleton mold member comprises an interior wall member, longitudinal flange members and annular flange members, with the flanges extending on the exterior side and the interior side of the wall member. The skeleton mold member is composed of a lightweight, slightly flexible material such as glass-fiber-reinforced resin, epoxy, plastic or the like. The skeleton mold member retains a polymer-aggregate concrete panel member composed primarily of cement, sand and polystyrene or similar component beads, wherein the polymer-aggregate concrete panel member is formed and cured in the skeleton mold member, with the peripheral edges of the flanges, or most preferably the peripheral edges of spacer members disposed between adjoining section members, serving as shaping guides for the outer surface of the polymer-aggregate concrete panel member. A glazing or crust layer composed primarily of resin, cement and sand is provided on the outer surface of the polymer-aggregate concrete panel member. The polymer-aggregate concrete material is relatively lightweight, slightly flexible and of low density, such that the section members are approximately equal in weight to similar sized wooden section members and are much lighter than similarly sized metal or metal/concrete section members. The section members are joined through the interior sections of the flanges by mechanical fasteners. Sealing means for capping the open ends of the assembled form and any other openings are provided such that the interior access bore of the assembled form may be pressurized by pressurizing means.

The methodology of the invention for utilizing the sectional form described above comprises the steps of engineering design of the cavity, form production to precise specifications, form assembly on site, pressurization, concrete pouring to surround the form, and form disassembly after curing. The apparatus and methodology provides a lightweight, flexible form of variable tri-dimensional shape to be built as a core or plug, such that high density foundation concrete can be poured thereon to form perfect hydraulic ducts or bores without undesirable edges, angles or corners, thereby reducing flow efficiency losses. The use of flanges and spacer members composed of materials that can be machined to precise tolerances results in a modular or sectional form with exact measurements that can be prefabricated, disassembled, shipped to a construction site, reassembled, and re-used multiple times.

DETAILED DESCRIPTION OF THE INVENTION

Figure 1:
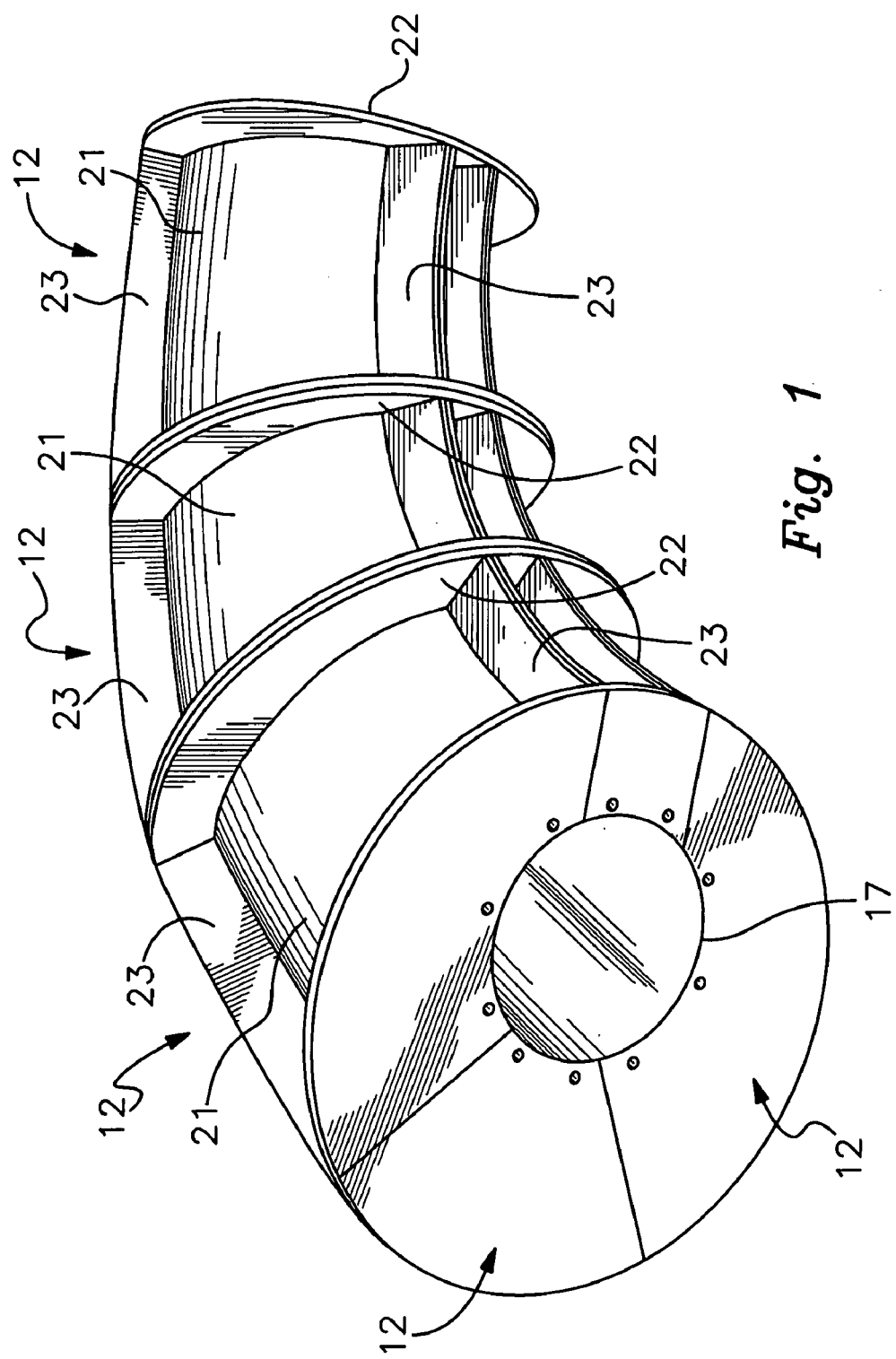
FIG. 1 is a perspective view of a short or partial form showing the mold skeleton members joined together prior to applying the polymer-aggregate concrete.
Figure 2:
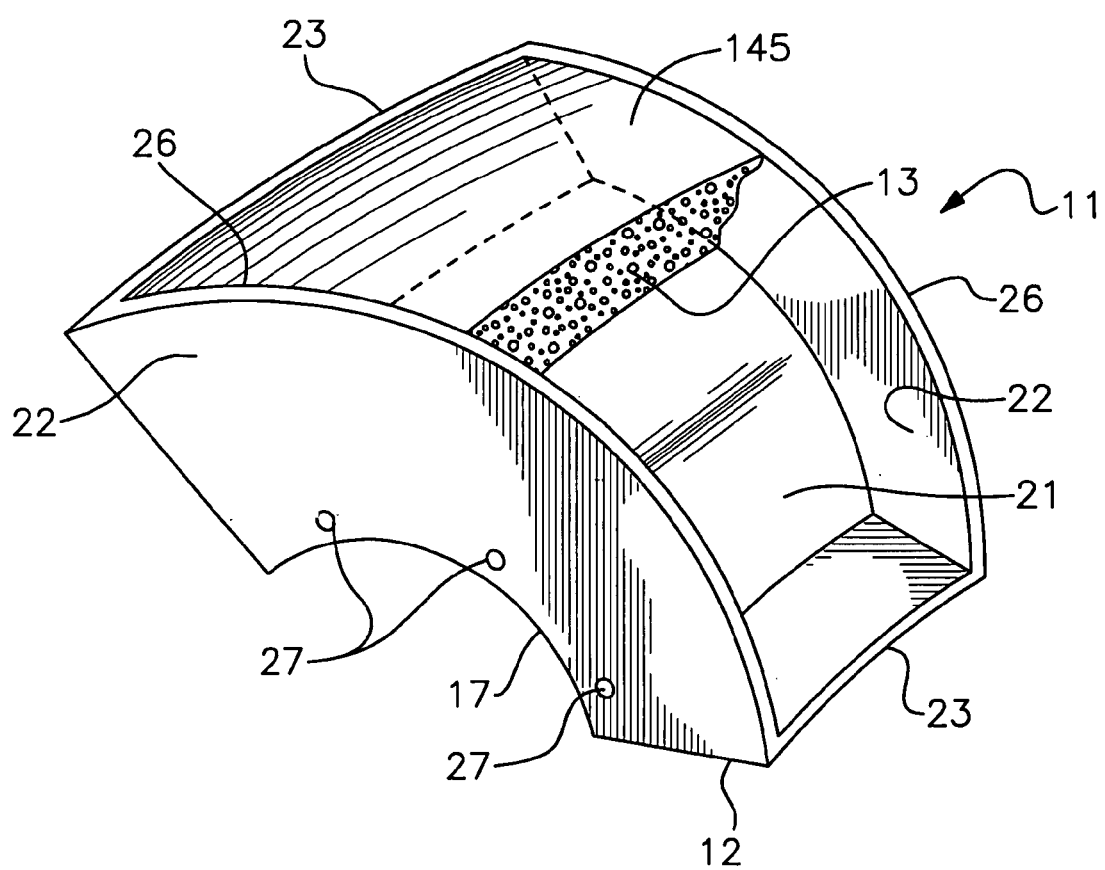
FIG. 2 is a perspective view of a section member comprising a mold skeleton member and the polymer-aggregate concrete panel member (shown as partially removed).
Figure 3:
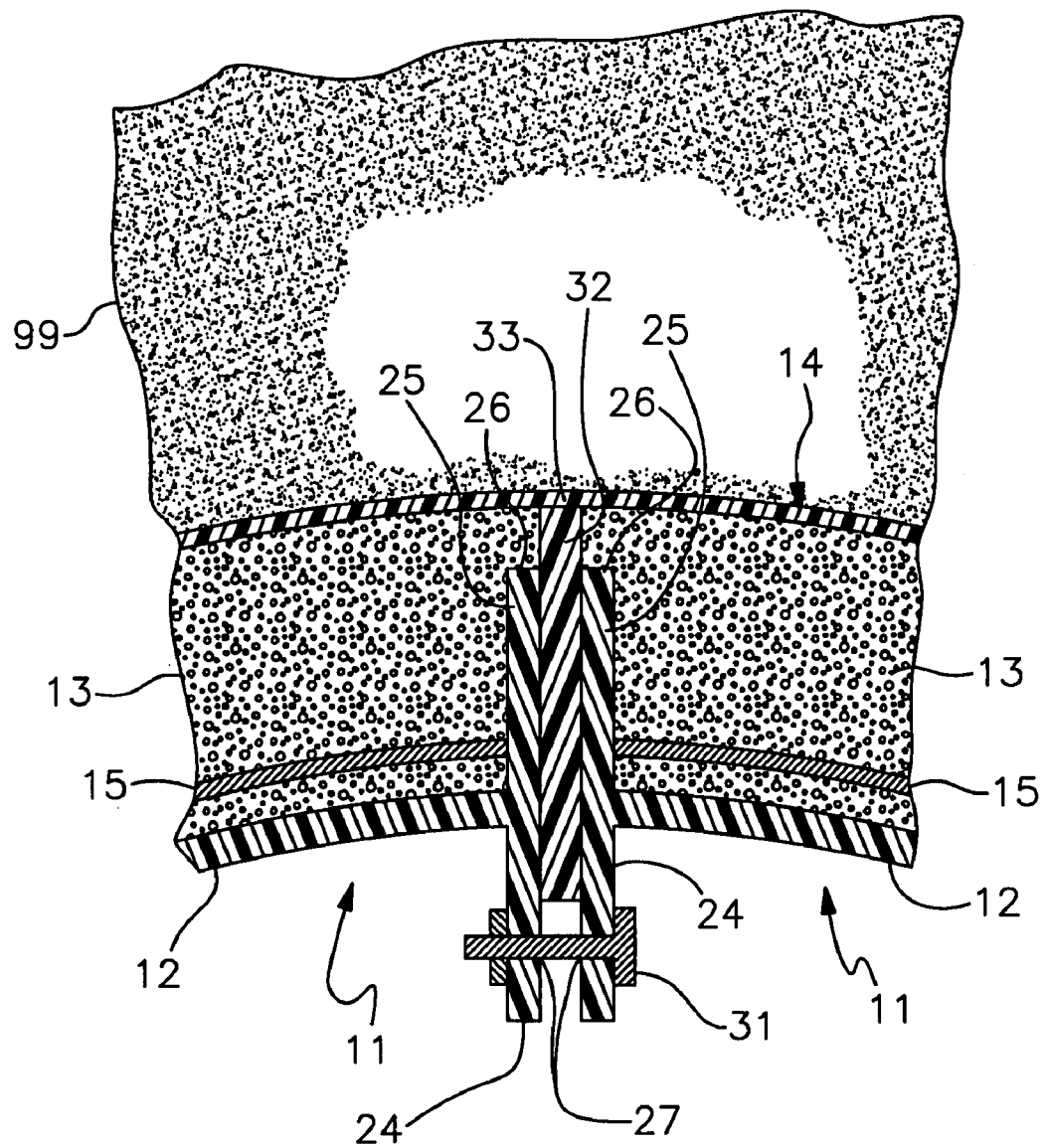
FIG. 3 is a cross-sectional view of a joint between adjacent section members.

With reference to the drawings, the invention will now be described in detail with regard for the best mode and the preferred embodiments. The invention is a system, apparatus or device comprising a modular or sectional form or plug that is used to define the shape of an internal cavity, tube or bore within a large concrete structure or block. The invention is also a method of forming an internal cavity, tube or bore within a concrete structure or block.

The sectional or modular form 10 is comprised of a plurality of section members 11 that are temporarily connected together to define an internal shape or configuration such that wet concrete is poured to embed or surround the form. Once the concrete 99 has sufficiently cured, the form 10 is dismantled and each of the section members 111 is removed. Removal of the form 10 leaves an internal cavity within the concrete structure or block 99 having a wall that corresponds to the outer surface of the form 10.

Each of the section members 111 of the form 10 is comprised of a mold skeleton member 12 and a polymer-aggregate concrete panel member 13. The mold skeleton members 12 are formed of a relatively lightweight, durable, slightly flexible material, such as glass-fiber-reinforced resin, epoxy, plastic or the like. Each mold skeleton member 12 comprises an interior tubular wall portion 21, a pair of annular flanges 22 and a pair of longitudinal flanges 23, the combination of which defines a tray-like configuration having a generally convex bottom with upstanding sides. The annular flanges 22 and the longitudinal flanges 23 are comprised of flange internal portions 24 and flange external portions 25. The flange external portions 25 extend outwardly from the interior tubular wall portion 21 and define the sides of the mold skeleton member 12. The flange internal portions 24 extend inwardly from the interior tubular wall portion 21, into the access bore 17 of the form 10 that is defined by the combination of multiple section members 11. The flange internal portions 24 provide means to join the section members 11 to each other, preferably by utilizing mechanical fasteners 31, for example nuts and bolts, inserted through connecting apertures 27 disposed at corresponding locations on the flange internal portions 24. In a preferred embodiment, at least one connecting aperture 27 for each junction is configured as a slot rather than a circle to allow for greater latitude in adjusting the adjoining section members 11.

Disposed within and bonded to the mold skeleton member 12 is a polymer-aggregate concrete panel member 13, with the outer surface of the polymer-aggregate concrete panel member 13 matching peripheral edges 26 of the annular flanges 22 and longitudinal flanges 23. The polymer-aggregate concrete panel member 13 is composed of a relatively lightweight concrete of reduced density, reduced compressive strength, increased flexibility and increased elasticity in comparison to standard concrete having dense particles such as rocks or pebbles for the aggregate component. In polymer-aggregate concrete, the aggregate component is composed of lightweight polymer or polymer foam pellets or similar lightweight, low density particles. For example, one cubic yard of a suitable polymer-aggregate concrete may be formulated by combining one cubic yard of polystyrene beads, 600 pounds of cement, 300 pounds of sand, 300 pounds of water and 15 pounds of bonding agents (all measurements approximates). This produces a concrete having a density equivalent to approximately 50 percent of water, or about 500 grams per liter, and a compressive strength approximately 20 percent of standard concrete. The cured concrete is significantly lighter than standard concrete, weighing approximately equal to an equivalent volume of wood, and retains slight flexibility and elasticity due to the presence of the polystyrene beads as aggregate particles. Wire mesh or similar reinforcing members 15 may be disposed within the polymer-aggregate concrete panel member 13. For large concrete structures, the polymer-aggregate concrete panel members 13 may be about eight to ten inches thick, while for smaller (i.e., room-sized structures), typical thickness is about two to three inches.

The overall dimensions of the section members 11 will vary dependent upon the size and configuration of the cavity to be created. The maximum dimensions of a section member 11 should preferably be kept such that it weighs less than about 40 kilograms, so it can be readily handled by two men, as ease of dismantling and assembling the form 10 is an important component of the invention. Since, as will be explained in more detail later, the peripheral edges 26 of the annular flanges 22 and longitudinal flanges 23, or the peripheral edges 33 of spacer members 32 disposed between adjacent flanges 22 or 23, are used to define and formulate the correct curved outer surface 14 of the form 10, the more rapidly or severely the curved surface of the cavity changes, the closer together the flanges 22 and 23 must be spaced in order to reproduce the corresponding shape on the form 10, thus reducing the overall dimensions of each section member 11.

Preferably, thin spacer members 32, composed of material identical or with similar properties to the material forming the mold skeleton members 12, are inserted between adjacent pairs of annular flanges 22 and adjacent pairs of longitudinal flanges 23, with the peripheral edge 33 of the spacer member 32 extending beyond the peripheral edges 26 of the flanges 22 and 23. In this construction, the peripheral edges 33 of the spacer members 32 serve as the guides for forming the form surface 14 of the polymer-aggregate concrete panel member 13.

With sectional members 11 joined both annularly and longitudinally to create a three-dimensional body, as shown in FIG. 1, the polymer-aggregate concrete panel member 13 is formed within each section member 11. This can be accomplished in advance or on site. Preferably, an external glaze layer 16 is applied to the outer surface of the polymer-aggregate concrete panel member 13 to define a smoother form surface 14. The glaze layer 16 is preferably composed of a mixture of acrylic resin, cement and fine sand such that a thin, approximately one-eighth to one-fourth inch, non-eroding crust is formed. Other materials such as polyurethane, epoxy or the like could also be used to create the glaze layer 16. The joined sectional members 11 define a three-dimensional, curved, tubular form 10 having an internal access bore 17 that allows passage within the bore 17 for assembly and dismantling the form 10. The form surface 14 can define an infinite number of shapes, from circles to ovals to ellipses to any curvilinear configuration.

Figure 4:
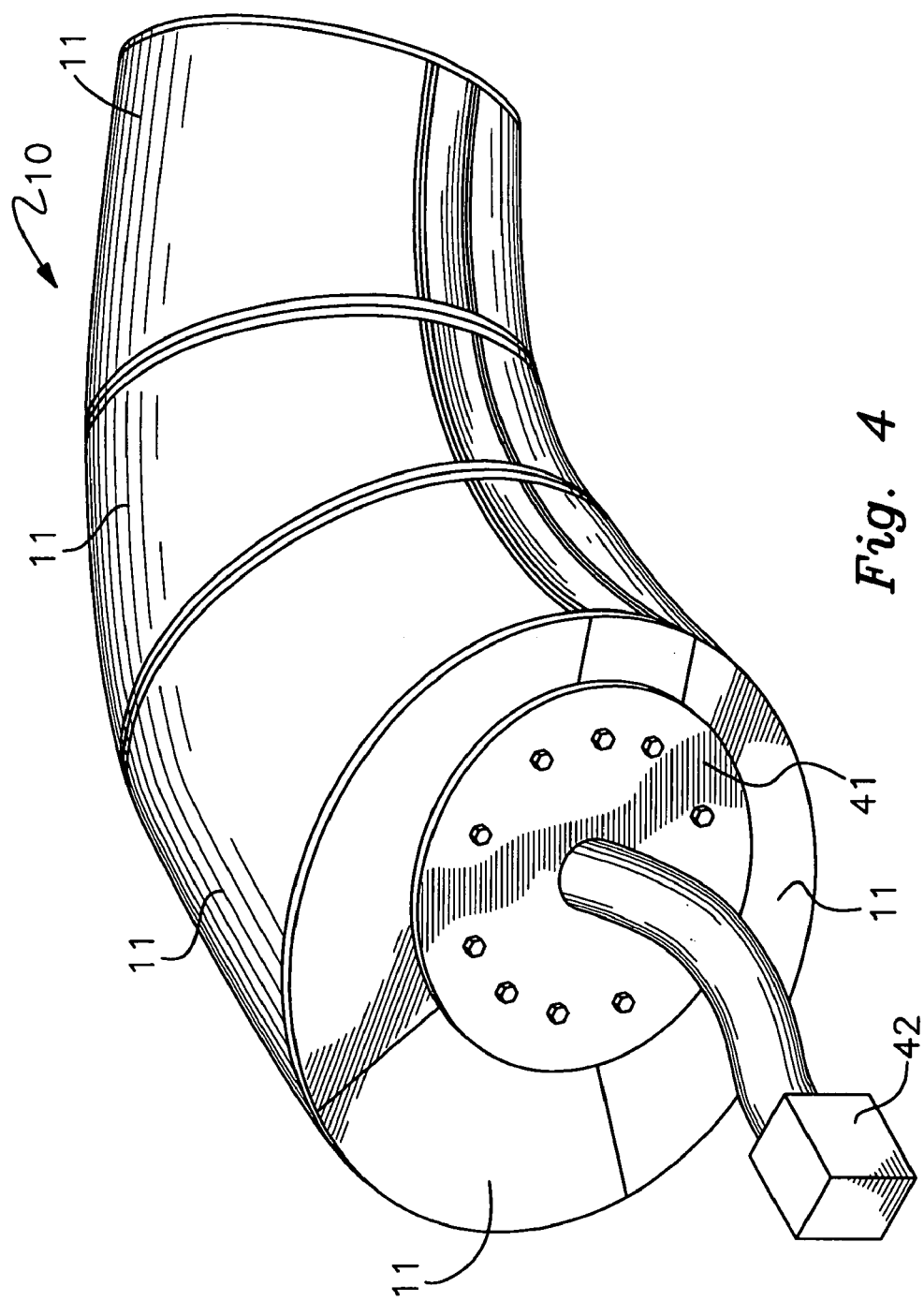
FIG. 4 is a perspective view similar to FIG. 1, showing the pressurization means and the form as ready to be embedded in concrete.

The form 10 is constructed such that it can be pressurized after assembly in order to provide greater resistance to the weight of the wet concrete used to form the concrete structure. As shown in FIG. 4, the access bore 17 is sealed by pneumatic sealing means 41, such as a panel, cap, curtain or end wall mechanically fastened to the exposed connecting apertures 27 of the end section members 11. Pressurizing means 42, illustrated representatively in the figure, of any type suitable to increase the air pressure within the form 10 is connected to the sealing means 41.

The method or process for engineering design of the form 10, creation of the form 10, assembly of the form 10, creation of the cavity within the concrete structure, and disassembly of the form 10 will now be described. Engineering drawings detailing the desired shape, configuration, dimensions, etc. of the cavity to be formed within the concrete structure 99 are prepared, based on the required mathematical 3-D definitions of the cavity. Dimensional tolerances and surface specifications as to hardness, porosity, roughness, physical resistance and chemical resistance are defined. Static, dynamic and exceptional stress analysis calculations are made. The engineering drawings are transversely sectioned, generally perpendicularly to the curving central axis of the tubular bore or cavity, with the spacing between sections being dictated by the degree of curvature. The more curved a given portion of the cavity is, the more closely spaced the transverse sections will be. Longitudinal sections are then defined, primarily to maintain the weight of each section member 11 below a defined limit.

To construct the mold skeleton members 12, a curved, generally cone-shaped sheet metal matrix is built, with adjustable struts to allow the curvature to be varied. The interior tubular wall 21 and flanges 22 and 23 are formed on the matrix out of glass fiber reinforced resin or a similar material, in a thickness of about one-fourth to three-eighth inches. Connecting apertures 27 are created in the flange internal portions 24. Once all the mold skeleton members 11 have been fabricated, a shop assembly is made to measure the tolerances and allow the adjustment of spacer members 32 that will define the form surface 14. After certification of measurements, all mold skeleton members 12 are carefully marked to insure correct reassembly on site.

On site, the mold skeleton members 12 are reassembled, aligned and measured to insure the accurate positioning of the spacer peripheral edges 33, inside braces are installed to stiffen the assembly. Reinforcing members 15 are affixed to the mold skeleton members 12. The polymer-aggregate concrete is prepared and applied to each mold skeleton member 12, preferably by spray or shotcrete application. The polymer-aggregate concrete is formulated to be relatively viscous to allow for shaping of the polymer-aggregate concrete panel member 13. The wet polymer-aggregate concrete is planed manually using prefabricated curved rulers that conform to the desired configuration of the form surface 14, with the spacer peripheral edges 33 of each mold skeleton member 12 acting as the planing guide for the concrete. Since each mold skeleton member 12 has it own set of spacer peripheral edges 33 and is separated from the adjacent mold skeleton members 11 by the flanges 22 and 23, the polymer-aggregate concrete panel member 13 can be applied and finished individually. This insures that the outer surface of each polymer-aggregate concrete panel member 13 will be accurate. After sufficient curing of the polymer-aggregate concrete panel members 13, typically about one day, the glaze layer 16 is applied to seal the concrete surface, preferably by brushing the mixture onto the polymer-aggregate concrete panel members 13 in the direction of the hydraulic flow. After the glaze layer 16 has cured, typically several days, it is inspected and touched up or repaired as needed to create a perfectly defined form surface 14. Prior to pouring of the wet concrete to create the concrete structure 99, a demolding agent is preferably applied to the glaze layer 16.

The fully assembled form 10 is then pressurized and the form surface 14 is measured to insure that the precise dimensions have been attained in the reassembled form 10. The reinforcing bars for the concrete structure 99 are positioned and the wet concrete is poured to embed or surround the pressurized form 10. The pressure increase should be of an amount to slightly expand the form 10 (typically about 20 to 40 psi to provide expansion of approximately 6 mm or less). In a typical installation, the concrete structure 99 may be about 4 meters thick, and pouring is performed in layers.

Once the concrete has set sufficiently, the form 10 is de-pressurized and dismantled by removing any interior bracing and disconnecting the adjoining section members 11. Because of the combination of the de-pressurization and the inherent slight flexibility of the section members 11, each can be pulled individually into the access bore 17 and taken from the cavity. The section members 11 are then cleaned, inspected and repaired if necessary. The form 10 can then be reassembled at a different location for reuse. It is contemplated that each form 10 may be used from 20 to 40 times if properly handled.

The amount of expansion at particular locations along the form 10 can be controlled by varying the density of the polymer-aggregate concrete or its thickness, since thinner and less dense panels 13 will expand more under pressure. The use of pneumatic stiffening allows for a relatively thin form relative to the amount of wet concrete being supported.

The above apparatus and methodology provides a lightweight, flexible form 10 of variable tri-dimensional shape to be built as a core or plug, such that high density foundation concrete can be poured thereon to form perfect hydraulic ducts or bores without undesirable edges, angles or corners, thereby reducing flow efficiency losses. The use of flanges 22 and 23 and spacer members 32 composed of materials that can be machined to precise tolerances result in a modular or sectional form 10 with exact measurements that can be prefabricated, disassembled, shipped to a construction site, reassembled, and re-used multiple times.

It is understood that equivalents and substitutions for certain elements set forth above may be obvious to those skilled in the art, and thus the true scope and definition of the invention is to be as et forth in the following claims.

I claim:

1. A method of forming a cavity within a concrete structure comprising the steps of:
   providing a plurality of rigid section members each comprising a flexible mold skeleton member and a polymer-aggregate concrete panel member joined to said mold skeleton member, said concrete panel member imparting rigidity to said flexible mold skeleton;
   each of said section members created by forming a mold skeleton member comprising a tubular wall portion, a pair of annular flanges and a pair of longitudinal flanges, with said annular flanges and said longitudinal flanges extending internally and externally relative to said tubular wall portion; spraying polymer-aggregate concrete onto the exterior of said three-dimensional form to completely fill the space between the externally extending portions of said annular flanges and the externally extending portions of said longitudinal flanges, and planing said sprayed polymer-aggregate concrete using said annular flanges and said longitudinal flanges as planing guides to produce a said smooth-walled exterior surface on said section members;
   joining said section members to each other to create a three-dimensional tubular form having a smooth-walled tubular exterior surface;
   pouring concrete onto said exterior surface of said form and allowing said concrete to cure to form a concrete structure;
   disassembling and removing said section members such that a smooth-walled tubular cavity is present within said concrete structure.

2. The method of claim 1, wherein said step of joining said section members to each other is performed by providing mechanical fasteners and connecting adjacent said annular flanges and adjacent said longitudinal flanges on the interior side of said tubular wall portions with said mechanical fasteners.

3. The method of claim 1, further comprising the step of internally pressurizing said three-dimensional form to increase its rigidity.

4. The method of claim 2, further comprising the step of internally pressurizing said three-dimensional form to increase its rigidity.

5. The method of claim 1, further comprising the step of applying a glaze layer onto said smooth-walled exterior surface on said three-dimensional tubular form.

6. A method of forming a curvilinear, tubular, smooth-walled cavity within a concrete structure comprising the steps of:
   providing a plurality of section members each comprising a flexible mold skeleton member comprising a tubular wall portion, a pair of annular flanges and a pair of longitudinal flanges, with said annular flanges and said longitudinal flanges extending internally and externally to said tubular wall portion;
   joining said section members to each other to create a three-dimensional tubular form;
   applying polymer-aggregate concrete onto the exterior of said section members to completely fill the space between the externally extending portions of said annular flanges and the externally extending portions of said longitudinal flanges, planing said sprayed polymer-aggregate concrete using said annular flanges and said longitudinal flanges as planing guides to produce a smooth-walled, curvilinear exterior surface on said three-dimensional tubular form, and allowing said polymer-aggregate concrete to cure to rigidify said section members;
   pouring concrete onto said exterior surface of said tubular form and allowing said concrete to cure to form a concrete structure;
   disassembling and removing said section members whereby a curvilinear, tubular, smooth-walled cavity is present within said concrete structure.

7. The method of claim 6, wherein said step of joining said section members to each other is performed by providing mechanical fasteners and connecting adjacent said annular flanges and adjacent said longitudinal flanges on the interior side of said tubular wall portions with said mechanical fasteners.

8. The method of claim 7, further comprising the step of internally pressurizing said three-dimensional form to increase its rigidity.

9. The method of claim 6, further comprising the step of applying a glaze layer onto said smooth-walled exterior surface on said three-dimensional tubular form after said polymer-aggregate concrete has cured.

10. A method of forming a curvilinear, tubular, smooth-walled cavity within a concrete structure comprising the steps of:
    providing a plurality of section members each comprising a flexible mold skeleton member comprising a tubular wall portion, a pair of annular flanges and a pair of longitudinal flanges, with said annular flanges and said longitudinal flanges extending internally and externally to said tubular wall portion;
    inserting spacer members between said annular flanges and said longitudinal flanges of adjoining said section members, said spacer members extending externally beyond said annular flanges and said longitudinal flanges;
    joining said section members to each other to create a three-dimensional tubular form;
    applying polymer-aggregate concrete onto the exterior of said section members to completely fill the space between the externally extending portions of said annular flanges, the externally extending portions of said longitudinal flanges and said spacer members, planing said sprayed polymer-aggregate concrete using said spacer members as planing guides to produce a smooth-walled, curvilinear exterior surface on said three-dimensional tubular form, and allowing said polymer-aggregate concrete to cure to rigidify said section members;

pouring concrete onto said exterior surface of said tubular form and allowing said concrete to cure to form a concrete structure;

disassembling and removing said section members and said spacer members whereby a curvilinear, tubular, smooth-walled cavity is present within said concrete structure.

11. The method of claim 10, wherein said step of joining said section members to each other is performed by providing mechanical fasteners and connecting adjacent said annular flanges and adjacent said longitudinal flanges on the interior side of said tubular wall portions with said mechanical fasteners.

12. The method of claim 11, further comprising the step of internally pressurizing said three-dimensional form to increase its rigidity.

13. The method of claim 10, further comprising the step of internally pressurizing said three-dimensional form to increase its rigidity.

14. The method of claim 10, further comprising the step of applying a glaze layer onto said smooth-walled exterior surface on said three-dimensional tubular form after said polymer-aggregate concrete has cured.

* * * * *